(12) United States Patent
Kondo et al.

(10) Patent No.: US 6,896,595 B2
(45) Date of Patent: May 24, 2005

(54) METHOD FOR CUTTING RARE EARTH ALLOY, METHOD FOR MANUFACTURING RARE EARTH MAGNET, AND WIRE-SAW MACHINE

(75) Inventors: Sadahiko Kondo, Takarazuka (JP); Akira Miyachi, Takatsuki (JP); Hazime Ishida, Takatsuki (JP)

(73) Assignee: Neomax Co., Ltd., Osaka (JP)

( * ) Notice: Subject to any disclaimer, the term of this patent is extended or adjusted under 35 U.S.C. 154(b) by 0 days.

(21) Appl. No.: 10/876,727

(22) Filed: Jun. 28, 2004

(65) Prior Publication Data

US 2004/0231134 A1 Nov. 25, 2004

Related U.S. Application Data

(62) Division of application No. 09/996,318, filed on Nov. 23, 2001, now Pat. No. 6,837,778.

(30) Foreign Application Priority Data

Nov. 24, 2000 (JP) ........................................ 2000-358462
Oct. 17, 2001 (JP) ........................................ 2001-318867

(51) Int. Cl.$^7$ ................................................. B24B 1/00
(52) U.S. Cl. .................... 451/49; 125/16.01; 125/16.02; 125/21; 83/151.1; 451/41
(58) Field of Search ........................... 451/41, 49, 168; 125/16.01, 16.02, 21, 23.01; 83/651.1

(56) References Cited

U.S. PATENT DOCUMENTS

| 4,005,044 | A | | 1/1977 | Raleigh | |
|---|---|---|---|---|---|
| 4,005,055 | A | | 1/1977 | Miron et al. | |
| 4,770,723 | A | * | 9/1988 | Sagawa et al. | 148/302 |
| 4,792,368 | A | * | 12/1988 | Sagawa et al. | 148/302 |
| 5,013,482 | A | * | 5/1991 | O'Neil | 252/395 |
| 5,176,850 | A | * | 1/1993 | O'Neil | 252/395 |
| 5,201,305 | A | * | 4/1993 | Takeuchi | 125/21 |
| 5,827,113 | A | * | 10/1998 | Okuno et al. | 451/36 |
| 5,896,851 | A | * | 4/1999 | Katamachi et al. | 125/16.02 |
| 6,006,737 | A | * | 12/1999 | Hayashi et al. | 125/16.02 |
| 6,381,830 | B1 | * | 5/2002 | Chikuba et al. | 29/557 |
| 6,390,896 | B1 | * | 5/2002 | Huber et al. | 451/59 |

FOREIGN PATENT DOCUMENTS

| JP | 09-029607 | 2/1997 |
|---|---|---|
| JP | 09-314548 | 12/1997 |
| JP | 10-166353 | 6/1998 |
| JP | 10-277914 | 10/1998 |
| JP | 11-198018 | 7/1999 |
| JP | 11-198020 | 7/1999 |
| JP | 11-277402 | 10/1999 |
| JP | 11-309661 | 11/1999 |
| JP | 2000-218504 | 8/2000 |
| JP | 2000-296455 | 10/2000 |

OTHER PUBLICATIONS

U.S. Appl. No. 09/662,136, Hazime Ishida., "Method and apparatus for cutting rare earth alloy", filed Sep. 14, 2000.
U.S. Appl. No. 09/566,736, Sadahiko Kondo, "Method of machining rare earth alloy and method of fabricating rare magnet using the same", filed May 9, 2000.

* cited by examiner

*Primary Examiner*—Lee D. Wilson
*Assistant Examiner*—Anthony Ojini
(74) *Attorney, Agent, or Firm*—Keating & Bennett, LLP

(57) ABSTRACT

A method for cutting a rare earth alloy using a wire with abrasive grains fixed to a core wire, including the step of cutting the rare earth alloy with the wire traveling in a state that a portion of the rare earth alloy to be cut with the wire is immersed in a coolant containing water as the main component, the coolant having a surface tension at 25° C. in a range of 25 mN/m to 60 mN/m.

2 Claims, 5 Drawing Sheets

METHOD FOR CUTTING RARE EARTH ALLOY, METHOD FOR MANUFACTURING RARE EARTH MAGNET, AND WIRE-SAW MACHINE

This application is a Divisional of U.S. patent application Ser. No. 09/996,318 filed Nov. 23, 20001, now U.S. Pat. No. 6,837,778.

BACKGROUND OF THE INVENTION

1. Field of the Invention

The present invention relates to a method for cutting a rare earth alloy, a method for manufacturing a rare earth magnet, and a wire-saw machine. More particularly, the present invention relates to a method for cutting a rare earth alloy using a sawing-wire with abrasive grains fixed to a core wire, and a method for manufacturing a rare earth magnet and a wire-saw machine adopting this cutting method.

2. Description of Related Art

Rare earth alloys have been used as strong magnet materials, for example. Rare earth magnets, obtained by magnetizing rare earth alloys, are suitably used as magnets for voice coil motors used for positioning a magnetic head of a magnetic recording apparatus, for example.

Conventionally, for cutting ingots (including sintered bodies) of rare earth alloys, a technique of slicing an ingot with a rotary slicing blade, for example, has been adopted. This technique using a slicing blade, however, requires an undesirably large cutting margin because the cutting edge of the slicing blade is comparatively thick. This reduces the yield of the rare earth alloy materials and therefore raises the cost of rare earth alloy products (rare earth magnets, for example).

A cutting method using a sawing wire is known as a method requiring a smaller cutting margin than the method using a slicing blade. For example, Japanese Laid-Open Patent Publication No. 11-198020 discloses that hard and brittle materials such as silicon, glass, neodymium, and ferrite can be cut using a sawing wire with abrasive superfine grains fixed to the circumference of a high-strength core wire via a bond layer (hereinafter, this type of wire is called an "abrasive grain-fixed wire").

The manufacture cost of rare earth magnets will be widely reduced if an ingot of a rare earth alloy can be cut using an abrasive grain-fixed wire as described above to produce a large number of plates having a predetermined thickness simultaneously with a reduced cutting margin. However, no report has ever been made on success of cutting of a rare earth alloy using an abrasive grain-fixed wire in a mass-production scale.

The present inventors have examined the above matter in various aspects and found that a main reason for the failure of cutting of a rare earth alloy using an abrasive grain-fixed wire in a mass-production scale is that the mechanical properties of a rare earth alloy, in particular, a rare earth alloy produced by a sintering method (hereinafter, referred to as a "rare earth sintered alloy") are greatly different from those of silicon and the like. Specifically, a rare earth sintered alloy, which is rather brittle as a whole and has a main phase (i.e., $R_2Fe_{14}B$ crystal grain) having a relatively high hardness and a grain boundary phase causing ductile fracture, is hard to be cut, unlike the hard and brittle material such as silicon. In other words, a rare earth sintered alloy exhibits high cutting resistance and as a result generates a large amount of heat, compared with the material such as silicon. In addition, the specific gravity of a rare earth alloy is about 7.5, which is large compared with that of silicon and the like, indicating that saw dust (sludge) generated by the cutting are settled and not easily discharged from a cut portion.

In view of the above, in order to cut a rare earth alloy efficiently with high machining precision, it is necessary to sufficiently reduce the cutting resistance and also efficiently release heat generated during the cutting, that is to say, efficiently cool a cut portion. It is also necessary to efficiently discharge saw dust generated by the cutting.

The cutting resistance can be reduced and heat generated during the cutting can be dissipated efficiently, by supplying a coolant (also called a "cutting fluid") excellent in lubricity to a cut portion of a rare earth alloy. According to the results of experiments conducted by the present inventors, by wetting a sawing wire with a sufficient amount of an oil-base coolant, the coolant can be sufficiently delivered to a narrow cut portion by the traveling wire (see U.S. patent application Ser. No. 09/662,136, for example).

However, use of an oil-base coolant has the following problems. It costs high to dispose of waste of the oil-base coolant to ensure not to cause environmental disruption. Also, it is difficult to separate saw dust (i.e., magnetic particles) from the waste and thus difficult to reuse the waste and the saw dust. In consideration of these, it appears suitable to use water (or a water-soluble liquid) as the coolant. However, since water is low in viscosity (1.0 $mm^2/s$), a sufficient amount of water is not allowed to adhere to a traveling wire, and therefore it is not possible to deliver a sufficient amount of water to a cut portion even when the wire is wet with water.

Japanese Laid-Open Patent Publication No. 11-198020 discloses that a coolant is allowed to adhere to an abrasive grain-fixed wire without fail even when the wire is traveling at high speed (for example, 2000 m/min) by making the wire travel in the coolant overflowing a coolant reservoir. However, according to experiments conducted by the present inventors, when a rare earth alloy is cut with a sawing wire that is traveling in overflowing water (as disclosed in Japanese Laid-Open Patent Publication No. 11-198020, for example), there arise problems that abrasive grains drop off and, in an extreme case, the wire snaps. These problems occurred even when the wire travel speed was as low as about 800 m/min, for example. This is probably because a sufficient amount of water was not delivered to a cut portion even by adopting the above method.

From another examination by the present inventors, it has been found that when a coolant containing water as the main component is used, abrasive grains tend to drop off the wire due to contact friction between adjacent windings of the wire on a reel bobbin around which the wire is wound (this phenomenon is sometimes called shedding or detachment).

The reason is found as follows. The coolant containing water as the main component is low in adhesion to the wire so as to be easily shaken off and also easily evaporates, compared with an oil-base coolant. Therefore, only a small amount of coolant, or virtually no coolant, is kept adhering to the wire when the wire is wound around the reel bobbin. With lack of a sufficient amount of coolant, it is unable to reduce heat generation, as well as mechanical friction force, due to friction between adjacent wire windings. In other words, it is presumed that although the coolant is supplied to the wire at the cut portion, the coolant on the wire is flung off during the travel of the wire before the wire is wound around the reel bobbin.

The inter-wire friction mechanically damages abrasive grains, even though it does not cause shedding of abrasive grains, resulting in reducing cutting precision and cutting efficiency. In a worse case, the bond layer may be peeled off together with the abrasive grains fixed thereto. In other words, when a coolant containing water as the main component is used, the life of the wire is shortened due to the inter-wire friction on the reel bobbin. Since an abrasive grain-fixed wire is comparatively expensive, it is desirable to make the life of the wire longer for at least reduction of the cost for the cutting.

It has also been found that the wire snaps with high frequency when a coolant containing water as the main component is used, compared with the case of using an oil-base coolant. This also shortens the life of the wire.

SUMMARY OF THE INVENTION

An object of the present invention is to provide a method for cutting a rare earth alloy with an abrasive grain-fixed wire, permitting use of a coolant containing water as the main component. Another object of the present invention is to make longer the life of a sawing wire of a wire-saw machine used for cutting a rare earth alloy using a coolant containing water as the main component. Yet another object of the present invention is to provide a wire-saw machine suitably usable for a cutting method as described above. Still another object of the present invention is to provide a method for manufacturing a rare earth magnet adopting the method for cutting a rare earth alloy described above, as well as a voice coil motor including a rare earth magnet manufactured by this method.

The method for cutting a rare earth alloy according to the first aspect of the present invention is a method for cutting a rare earth alloy using a wire with abrasive grains fixed to a core wire, including the step of cutting the rare earth alloy with the wire traveling in a state that a portion of the rare earth alloy to be cut with the wire is immersed in a coolant containing water as the main component, the coolant having a surface tension at 25° C. in a range of 25 mN/m to 60 mN/m.

The coolant preferably contains a water-soluble synthetic lubricant and water in a weight 10 times to 50 times as large as the weight of the synthetic lubricant.

The coolant may contain a surfactant and water in a weight 10 times to 50 times as large as the weight of the surfactant.

The coolant may contain an antifoaming agent.

The coolant preferably has a pH of 8 to 11, more preferably 9 or more.

The coolant may contain an anticorrosive.

In a preferred embodiment, the abrasive grains are fixed via a resin layer formed on the outer circumference of the core wire.

In another preferred embodiment, the average distance between the adjacent abrasive grains in a direction of travel of the wire is in a range of 150% to 600% of the average particle size of the abrasive grains, and the average height of portions of the abrasive grains protruding from the surface of the resin layer is in the range of 10 $\mu$m to 40 $\mu$m.

The average particle size D of the abrasive grains preferably satisfies the relationship 20 $\mu$m$\leq$D$\leq$60 $\mu$m.

Preferably, in the step of cutting, the portion of the rare earth alloy to be cut with the wire is immersed in the coolant contained in a reservoir, and the coolant is supplied into the reservoir from the bottom of the reservoir and also from an opening of the reservoir, so that the coolant is kept overflowing from the opening.

The amount of overflow of the coolant per minute is preferably 50% or more of the volume of the reservoir.

In the step of cutting, the amount of the coolant supplied into the reservoir from the opening is preferably greater than the amount of the coolant supplied from the bottom.

Preferably, in the step of cutting, curtain-like flows of a gas or the coolant are formed above the sides of the opening of the reservoir crossing the wire travel direction, so that the coolant is suppressed from overflowing from the opening of the reservoir.

Preferably, the wire is driven by a roller, the roller includes a polymer layer having a guide groove formed therein, the guide groove has a pair of slopes at least one of which has an angle of 50 degrees or more with respect to the surface of the roller, and the wire travels along a space between the pair of slopes.

The rare earth alloy may be a R—Fe—B rare earth sintered alloy, and it may be a Nd—Fe—B rare earth sintered alloy.

The method for manufacturing a rare earth magnet according to the first aspect of the present invention includes the steps of: producing a rare earth magnet sintered body from rare earth alloy powder; and dividing the sintered body into a plurality of rare earth magnets by any of the methods for cutting a rare earth alloy according to the first aspect of the present invention described above.

The voice coil motor according to the first aspect of the present invention includes a rare earth magnet manufactured by the method for manufacturing a rare earth magnet according to the first aspect described above. The thickness of the rare earth magnet may be in a range of 0.5 mm to 3.0 mm.

The method for cutting a rare earth alloy according to the second aspect of the present invention is a method for cutting a rare earth alloy using a wire with abrasive grains fixed to a core wire, including the steps of: allowing the wire wound around a reel bobbin to travel between a plurality of rollers; supplying a first coolant containing water as the main component to portions of the wire wound around the reel bobbin or portions of the wire traveling near the reel bobbin; and cutting the rare earth alloy with the traveling wire while a second coolant containing water as the main component is supplied to a portion of the rare earth alloy to be cut with the wire.

The first coolant preferably has a coefficient of dynamic friction against the rare earth alloy at 25° C. of 0.3 or less.

The second coolant preferably has a coefficient of dynamic friction against the rare earth alloy at 25° C. in a range of 0.1 to 0.3.

The first coolant is preferably supplied to the wire by spraying.

In a preferred embodiment, the abrasive grains are fixed via a resin layer formed on the outer circumference of the core wire.

The resin is preferably a phenol resin, an epoxy resin, or a polyimide resin.

In a preferred embodiment, the average distance between the adjacent abrasive grains in a direction of travel of the wire is in a range of 150% to 600% of the average particle size of the abrasive grains, and the average height of portions of the abrasive grains protruding from the surface of the resin layer is in a range of 10 $\mu$m to 40 $\mu$m.

The first coolant may be higher in viscosity than the second coolant.

The first coolant and the second coolant preferably have a temperature in a range of 15° C. to 35° C.

Preferably, each of the plurality of rollers includes a polymer layer having a guide groove formed therein, the guide groove has a pair of slopes at least one of which has an angle of 50 degrees or more with respect to the surface of the roller, and the wire travels along a space between the pair of slopes.

The rare earth alloy may be a R—Fe—B rare earth sintered alloy, and it may be a Nd—Fe—B rare earth sintered alloy.

The method for manufacturing a rare earth magnet according to the second aspect of the present invention includes the steps of: producing a rare earth magnet sintered body from rare earth alloy powder; and dividing the sintered body into a plurality of rare earth magnets by any of the methods for cutting a rare earth alloy according to the second aspect of the present invention described above.

The voice coil motor according to the second aspect of the present invention includes a rare earth magnet manufactured by the method for manufacturing a rare earth magnet according to the second aspect described above. The thickness of the rare earth magnet may be in a range of 0.5 mm to 3.0 mm.

The wire-saw machine according to the second aspect of the present invention includes: a wire with abrasive grains fixed to a core wire; a reel bobbin around which the wire is wound; a plurality of rollers for unwinding the wire wound around the reel bobbin to allow the wire to travel; a device for supplying a first coolant to a portion of a cut object to be cut with the wire; and a device for supplying a second coolant to portions of the wire wound around the reel bobbin or portions of the wire traveling near the reel bobbin.

The device for supplying the second coolant preferably includes a sprayer.

Preferably, each of the plurality of rollers includes a polymer layer having a guide groove formed therein, the guide groove has a pair of slopes at least one of which has an angle of 50 degrees or more with respect to the surface of the roller, and the wire travels along a space between the pair of slopes.

Another wire-saw machine according to the present invention includes: a wire with abrasive grains fixed to a core wire; a reel bobbin around which the wire is wound; a plurality of rollers for unwinding the wire wound around the reel bobbin to allow the wire to travel; and a device for supplying a coolant to a portion of a cut object to be cut with the wire, wherein each of the plurality of rollers includes a polymer layer having a guide groove formed therein, the guide groove has a pair of slopes at least one of which has an angle of 50 degrees or more with respect to the surface of the roller, and the wire travels along a space between the pair of slopes.

The tension of the wire traveling between the plurality of rollers is preferably in a range between 25 N and 35 N.

DETAILED DESCRIPTION OF THE INVENTION

Figure 1:
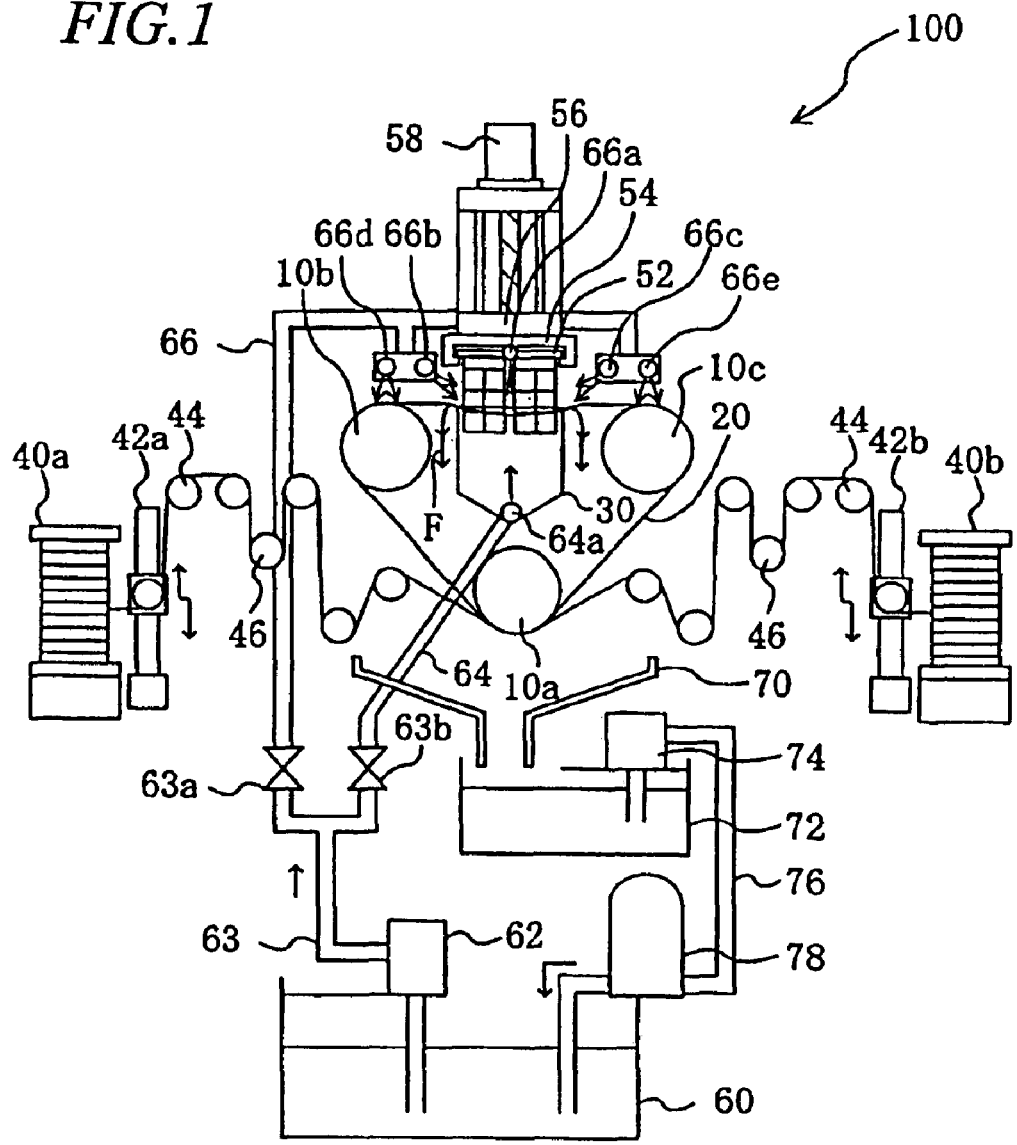
FIG. 1 is a diagrammatic view of a wire-saw machine 100 suitably used for implementing the method for cutting a rare earth alloy of an embodiment of the present invention.

Hereinafter, the method for cutting a rare earth alloy and the method for manufacturing a rare earth magnet according to the first aspect of the present invention will be described.

The cutting method according to the first aspect is a method for cutting a rare earth alloy using a wire with abrasive grains (typically, diamond abrasive grains) fixed to a core wire (typically, a piano wire). The cutting method includes a process step of cutting a rare earth alloy with the wire traveling in the state that the portion of the rare earth alloy to be cut with the wire is immersed in a water-soluble coolant having a surface tension at 25° C. in the range of 25 mN/m to 60 mN/m. A coolant of which the coefficient of dynamic friction against a rare earth alloy at 25° C. is 0.1 to 0.3 may also be used.

In the method for cutting a rare earth alloy according to the first aspect of the present invention, in which cutting of a rare earth alloy with the abrasive grain-fixed wire is performed in the state that the cut portion of the rare earth alloy is immersed in a coolant having a surface tension in the range of about 25 mN/m to about 60 mN/m (about 25 dyn/cm to about 60 dyn/cm) at 25° C., efficient cooling of the wire is possible. This is presumably because the coolant having a surface tension falling within the above range is excellent in wettability (or conformability) for the rare earth alloy and/or the wire, compared with water, and therefore, the coolant infiltrates (i.e., penetrates) into the cut portion with good efficiency. The cut portion is the portion of the rare earth alloy coming into contact with the wire and cut with the wire. This portion is also called a cut groove. Also, naturally, the coolant containing water as the main component exhibits high cooling efficiency because it is high in specific heat compared with an oil-base coolant (for example, mineral oil). The "coolant containing water as the main component" as used herein refers to a coolant in which water occupies 70 wt. % or more of the entire liquid.

A suitable coolant for use in the method for cutting a rare earth alloy of the present invention may also be determined by the coefficient of dynamic friction against the rare earth alloy. A coolant having a coefficient of dynamic friction at 25° C. in the range of about 0.1 to about 0.3 exhibits the function/effect equivalent to those exhibited by the coolant having a surface tension within the range specified above. The coefficient of dynamic friction is considered as an indicator of lubricity provided by the coolant for the cut portion, while the surface tension is considered as an indicator of infiltration of the coolant into the cut portion. It is known that there is a qualitative correlation between the surface tension and the coefficient of dynamic friction.

The surface tension of the coolant is measured with a known de Nouy tensiometer. The coefficient of dynamic friction of the coolant against a rare earth alloy is measured with a Masuda-type "four-ball friction tester" often used in Japan as a basic tester. Herein, in both cases (i.e., the surface tension and the coefficient of dynamic friction), measured values at 25° C. are adopted as values characterizing the coolant.

Note that the coefficient of dynamic friction specified in the embodiments to follow is a value measured with a four-ball friction tester using iron balls. A R—Fe—B rare earth alloy (R is an element selected from the rare earth elements and Y; an example of the R—Fe—B rare earth alloy is an alloy containing $Nd_2Fe_{14}B$ intermetallic compound as the main phase) used in the embodiments contains iron in the largest amount among the constituent elements. Therefore, the coefficient of dynamic friction of the coolant measured with the tester using iron balls can be a value very close to and thus adopted as the coefficient of dynamic friction of the coolant against the rare earth alloy. This close relationship was confirmed experimentally. The compositions and preparation methods of rare earth alloys suitably used for rare earth magnets are described in U.S. Pat. Nos. 4,770,723 and 4,792,368, for example. The contents of U.S. Pat. Nos. 4,770,723 and 4,792,368 are incorporated herein by reference. In the typical composition of R—Fe—B rare earth alloy, Nd or Pr is mainly used as R, Fe may be partially replaced by a transition element (e.g., Co), and B may be replaced by C.

Although the coolant usable for the cutting method of the present invention was specified by the surface tension or the coefficient of dynamic friction measured at 25° C., the temperature of the coolant when actually used is not limited to 25° C. To obtain the effect of the present invention, however, it is preferable to use the coolant temperature-controlled to fall within the range of 15° C. to 35° C., more preferably within the range of 20° C. to 30° C., further more preferably within the range of 20° C. to 25° C. As is well known, the surface tension and coefficient of dynamic friction of a coolant depend on the temperature. Therefore, if the temperature of the coolant is excessively out of the above temperature range, the coolant will exhibit a state considerably resembling the state observed when the surface tension and dynamic friction of the coolant fall outside the respective ranges described above. This deteriorates cooling or cutting efficiency.

By using the coolant described above, abnormal temperature rise of the wire is suppressed, and this suppresses/prevents abnormal shedding of abrasive grains and snapping of the wire (i.e., wire breakage). As a result, degradation in machining precision is prevented, and also the life of the wire can be made longer than conventionally allowed. This enables reduction in manufacturing cost.

The coolant described above is prepared by adding a surfactant and a synthetic lubricant to water. The surface tension and the coefficient of dynamic friction can adjusted to predetermined values by appropriately selecting the types and added amounts of these additives. Since the coolant containing water as the main component is comparatively low in viscosity, saw dust of the rare earth alloy can be easily separated from sludge generated during the cutting, by use of a magnet, and thus the coolant can be reused. In addition, the problem of environmental disruption due to disposal of a coolant is prevented. Moreover, since the amount of carbon contained in the sludge is small, a magnet that will be produced using saw dust separated from the sludge as a raw material can exhibit improved magnetic properties.

When the wire travels at high speed during the cutting, the coolant may foam in some cases, causing reduction in cooling efficiency. This reduction in cooling efficiency due to foaming of the coolant can be suppressed by using a coolant containing an antifoaming agent. Corrosion of the rare earth alloy can be suppressed by using a coolant having a pH in the range of 8 to 11. The pH of the coolant is more preferably 9 or more. Oxidation of the rare earth alloy can be suppressed by using a coolant containing an anticorrosive. These additives may be appropriately adjusted in consideration of the type of the rare earth alloy, the cutting conditions, and the like.

As the sawing wire, a wire with diamond abrasive grains fixed thereto with a resin is suitably used. More specifically, diamond abrasive grains are fixed to the outer circumference of a core wire (typically, a piano wire) with a resin. As the resin, phenol resins, epoxy resins, and polyimide resins are preferably used. These resins are high in adhesion strength to the outer circumference of a piano wire (hard steel wire), and also excellent in wettability (infiltration) for the coolant as will be described later. This type of wire is inexpensive compared with a wire produced by electrodeposition (electro-plating), and thus the cost required for the cutting of the rare earth alloy can be reduced. The core wire is not limited to a piano wire, but may be made of an alloy such as Ni—Cr and Fe—Ni, a metal having a high melting point, such as W and Mo, or a bundle of high-strength fibers such as nylon fibers. The material for the abrasive grains is not limited to diamond, but may be SiC, B, C, CBN (cubic boron nitride), or the like.

To ensure the advantage that the cutting margin is small, the outer diameter of the sawing wire is preferably 0.3 mm or less, more preferably 0.25 mm or less. The lower limit of the outer diameter of the wire is determined in consideration that a sufficient strength is secured, and to ensure that abrasive grains having a predetermined size are fixed to the core wire with sufficient strength, the diameter of the core wire is preferably about 0.12 mm to about 0.20 mm, more preferably about 0.15 mm to about 0.2 mm. The average particle size D of abrasive grains preferably satisfies 20 $\mu m \leq D \leq 60$ $\mu m$, more preferably 30 $\mu m \leq D \leq 60$ $\mu m$, particularly preferably 40 $\mu m \leq D \leq 60$ $\mu m$, from the standpoint of cutting efficiency. From the standpoint of cutting efficiency and discharge efficiency of saw dust (sludge), the average distance between adjacent abrasive grains is preferably in the range of 150% to 600% of the average particle size D of abrasive grains, and the average height of the portions of the abrasive grains protruding from the surface of the resin layer is preferably in the range of 10 $\mu m$ to 40 $\mu m$, more preferably in the range of 15 $\mu m$ to 40 $\mu m$. The wire described above is available from general wire manufacturers (for example, Allied Material Corp.) by specifying the above conditions.

By using the wire described above, good cutting efficiency is attained and the discharge efficiency of saw dust (i.e., sludge) improves. This enables cutting at a comparatively high travel speed (for example, 1000 m/min). Moreover, since the wire is cooled efficiently with the coolant described above, the cutting of the rare earth alloy can be performed with high machining precision stably over a long period of time. By using the coolant containing water as the main component, the wire travel speed can be set higher by 20 to 30% (for example, at 1100 m/min to 1200 m/min) than that in the case of using an oil-base coolant, to optimize the cutting efficiency.

The coolant containing water as the main component used in the cutting method of the present invention is low in viscosity (kinematic viscosity: about 1 $mm^2/s$), and therefore low in discharge efficiency of saw dust, compared with an oil-base coolant (kinematic viscosity: generally 5 $mm^2/s$ or more). To increase the discharge efficiency of saw dust, during the cutting process, the cut portion is preferably kept immersed in the coolant filled in a reservoir. Also, the coolant is preferably supplied from the top opening of the reservoir, in addition to being supplied from the bottom thereof, so that the coolant is kept overflowing from the opening of the reservoir.

Saw dust discharged into the low-viscosity coolant easily settle down, hardly floating in the surface portion of the coolant near the opening of the reservoir. In order to cut the rare earth alloy while the cut portion thereof is kept immersed in the coolant, the wire is placed so that it travels in the surface portion of the coolant near the opening of the reservoir. Therefore, the amount of saw dust is small in the portion of the coolant in which the wire travels, and thus the coolant supplied to the cut portion contains only a small amount of saw dust. In particular, since the coolant is supplied from the top opening of the reservoir to keep the coolant overflowing from the opening, it is ensured that the amount of saw dust in the coolant supplied to the cut portion is small. In addition, saw dust attaching to the wire can be automatically washed away by the flow of the coolant supplied from the opening of the reservoir. The amount of the coolant overflowing for one minute is preferably 50% or more of the volume of the reservoir. The amount of the coolant supplied from the opening is preferably greater than the amount of the coolant supplied from the bottom of the reservoir.

Curtain-like flows of the coolant (or gas flow) may be formed above the sides of the opening of the reservoir crossing the wire travel direction, so that the coolant is suppressed from overflowing from the opening of the reservoir and thus the liquid level of the overflowing coolant is raised beyond the wall of the reservoir. This results in a larger amount of coolant being supplied to the surroundings of the cut portion and thus enables further reduction of the amount of saw dust in the coolant. The delivery pressure of the coolant required to generate the flow of the coolant is preferably in the range of 0.2 MPa (2 kgf/cm$^2$) to 1.0 MPa (10 kgf/cm$^2$), more preferably in the range of 0.4 MPa (4 kgf/cm$^2$) to 0.6 MPa (6 kgf/cm$^2$). If the delivery pressure is lower than the above range, the effect may not be satisfactory, and if it exceeds the above range, the wire may bend resulting in degradation in machining precision.

Preferably, the coolant is also supplied to a pair of main rollers placed on both sides of the reservoir for regulating the wire travel position, among main rollers provided for the travel of the wire. With this supply of the coolant to these main rollers, a polymer layer (for example, an organic polymer layer such as a polyurethane rubber layer) having grooves for guiding the wire, formed on the surface of each of the main rollers, is prevented from temperature rise. In addition, saw dust (or sludge) attaching to or staying on the wire or the guide grooves can be washed away. This prevents the wire travel position from deviating and the wire from slipping off the groove.

The coolant can be reused (used in a circulating system, for example) by collecting the dirty liquid composed of the coolant and sludge including saw dust of the rare earth alloy, generated during the cutting process, and separating the saw dust of the rare earth alloy from the sludge with a magnet. Since the coolant containing water as the main component is low in viscosity as described above, the saw dust can be easily separated. By separating the saw dust of the rare earth alloy, also, the waste coolant can be easily disposed of without entailing damage to the environment. Moreover, since the amount of carbon, which is not easily separated from a R—Fe—B alloy (R is selected from the rare earth elements and Y), is small as described above, the saw dust can be remelted and recycled as a raw material for the rare earth alloy. That is, since the coolant contains water as the main component, it is easy to reduce the carbon content of a rare earth alloy that will be produced by recycling the saw dust. Thus, a raw material usable as a material for rare earth magnets can be obtained. For separation of saw dust from sludge, the method disclosed in U.S. patent application Ser. No. 09/662,136 by the applicant of the present invention, for example, may be used.

The cutting method of the present invention is suitably applicable to cutting of a hard-to-cut rare earth sintered alloy, in particular, cutting of a R—Fe—B rare earth sintered alloy. Cut pieces into which the rare earth alloy is cut by the cutting method of the present invention are surface-treated and magnetized to provide rare earth magnets. The magnetization process may be performed before or after the cutting process. A rare earth magnet produced from a R—Fe—B rare earth sintered alloy is suitably used as a material for a voice coil motor used for positioning a magnetic head. In particular, the cutting method of the present invention is suitably used for cutting of the R—Fe—B rare earth sintered magnets (alloys) disclosed in U.S. Pat. Nos. 4,770,723 and 4,792,368 assigned to the assignee of the present application. Among these, the cutting method of the present invention is suitably applied to cutting and manufacture of a rare earth sintered magnet (alloy) essentially composed of neodymium (Nd), iron (Fe), and boron (B) as main components, and having a hard phase (main phase) formed of a $Nd_2Fe_{14}B$ intermetallic compound having a tetragonal structure and a viscous Nd-rich grain boundary phase (hereinafter, this magnet is called a "neodymium magnet (alloy)"). A typical example of the neodymium magnet is NEOMAX (product name) manufactured by Sumitomo Special Metals Co., Ltd.

By adopting the cutting method according to the first aspect of the present invention, a rare earth alloy can be cut efficiently with high precision. Therefore, small rare earth magnets (thickness: 0:5 mm to 3.0 mm, for example) for voice coil motors used for positioning a magnetic head, for example, can be manufactured efficiently with high precision.

Next, the method for cutting a rare earth alloy and the method for manufacturing a rare earth magnet according to the second aspect of the present invention will be described.

The cutting of a rare earth alloy according to the second aspect of the present invention uses a sawing wire (an abrasive grain-fixed wire) with abrasive grains (typically, diamond abrasive grains) fixed to a core wire (typically, a piano wire). The wire wound around a reel bobbin travels between a plurality of rollers, and a rare earth alloy (workpiece) is lowered to and pressed against the traveling wire to be cut into pieces. During the cutting, a coolant (second coolant) having water as the main component is supplied to the portion of the rare earth alloy to be cut with the wire. Also, a coolant (first coolant) having water as the main component is supplied to the portions of the wire wound around the reel bobbin and the portions of the wire traveling near the reel bobbins.

In an embodiment according to the second aspect of the present invention, a coolant is also supplied to the wire when it is wound around the reel bobbins. This reduces heat generation, as well as mechanical friction force, due to friction between adjacent wire windings on the reel bobbins. As a result, since the mechanical damage on the wire is reduced, degradation in cutting precision and cutting efficiency is suppressed, and the life of the wire is made longer. The coolant (second coolant) supplied to the cut portion and the way of supply of this coolant are preferably the same as those adopted in the embodiment according to the first aspect of the present invention.

The first coolant preferably has a coefficient of dynamic friction against a rare earth alloy at 25° C. of 0.3 or less, more preferably 0.15 or less. The second coolant preferably has a coefficient of dynamic friction against a rare earth alloy at 25° C. in the range of 0.1 to 0.3.

Although the first and second coolants usable for the cutting method of the present invention were specified by the coefficient of dynamic friction measured at 25° C., the temperature of the coolant when actually used is not limited to 25° C. To obtain the effect of the present invention, however, it is preferable to use the coolant temperature-controlled to fall within the range of 15° C. to 35° C., more preferably within the range of 20° C. to 30° C., further more preferably within the range of 20° C. to 25° C.

By using the coolant having a coefficient of dynamic friction specified above, abnormal temperature rise of the wire is effectively prevented, and thus abnormal shedding of abrasive grains and snapping of the wire are effectively suppressed/prevented. As a result, degradation in machining precision is prevented, and also the life of the wire can be made longer than conventionally allowed. This enables reduction in manufacturing cost.

The effect described above is applicable to both the first coolant supplied to the portions of the wire wound around the pair of reel bobbins and the portions traveling near the reel bobbins and the second coolant supplied to the cut portion. A common coolant may therefore be used as the first and second coolants. Alternatively, the first coolant may have a viscosity higher than the second coolant so that the first coolant easily adheres to the portions of the wire wound around the reel bobbins or traveling near the reel bobbins. As the first and second coolants, a coolant having a viscosity in the range of 1 mPa·s to 50 mPa·s (kinematic viscosity: 1 mm$^2$/s to 50 mm$^2$/s) may be used. To enhance the adhesion of the first coolant to the wire, a coolant having a viscosity of 5 mPa·s or more (kinematic viscosity: 5 mm$^2$/s or more) is preferably used. The viscosity of the coolants can be adjusted by controlling the concentration of the lubricant mixed with water described above.

The first coolant is not necessarily supplied through the entire cutting process, but may be supplied intermittently as long as the portions of the wire wound around the reel bobbins can be kept moistened with a sufficient amount of coolant. Note that a coolant containing water as the main component (in particular, one containing alkanolamine or the like) adversely affects a resin more greatly than an oil-base coolant. Therefore, the amount of the coolant is preferably as small as possible when a wire with abrasive grains fixed thereto via a resin layer is used. In consideration of this, the coolant is preferably supplied to the portions of the wire wound around the reel bobbins or traveling near the reel bobbins by spraying or dropping. Spraying is particularly preferable because this permits supply of only a small amount of coolant to the portions of the wire wound around the reel bobbins. The supply amount of the coolant may be appropriately determined depending on the type, length, travel speed, and the like of the wire. For example, it may be in the range of 50 ml/min to 500 ml/min. Note however that, if a sawing wire excellent in resistance against a water-base coolant, such as an electrodeposited wire (for example, a wire with abrasive grains fixed thereto via a Ni plating layer) is used, the entire reel bobbins may be immersed in the coolant.

In the embodiments according to the first and second aspects of the present invention, each of the guide grooves formed in the polymer layer of each roller along which the wire travels may have a pair of slopes at least one of which has an angle equal to or more than 50 degrees with respect to the surface of the roller, which is a plane parallel with the axis of the roller. By adopting this structure, the wire, which travels along a space between the pair of slopes, is suppressed from snapping that otherwise tends to occur when a coolant containing water as the main component is used. Naturally, both of the pair of slopes preferably have an angle equal to or more than 50 degrees with respect to the surface of the roller. The tension of the wire traveling between the rollers is preferably in the range between 25 N and 35 N.

(Embodiment 1)

Hereinafter, an embodiment of the method for cutting a rare earth alloy of the present invention will be described in more detail with reference to the relevant drawings. In this embodiment, a method for cutting a neodymium magnet sintered body used for manufacture of the neodymium magnet described above will be described.

First, a method for manufacturing a neodymium (Nd—Fe—B) sintered magnet will be briefly described. A rare earth alloy as a magnet material can be produced by any of the methods disclosed in detail in U.S. Pat. Nos. 4,770,723 and 4,792,368 described above, for example.

Material metals are exactly scaled at a predetermined ratio of mole fractions, and then melted in a crucible by a high-frequency induction melting method in vacuum or in an argon gas atmosphere. The molten material metals are cast into a water-cooled mold, thereby preparing a raw material alloy at the predetermined ratio. The raw material alloy is then pulverized to prepare fine powder having an average particle size of about 3 $\mu$m to about 4 $\mu$m. Subsequently, the fine powder is put in a die assembly and subjected to press compacting in a magnetic field. This press compacting is performed after the fine powder has been mixed with a lubricant if necessary. The resultant compact is subjected to sintering at about 1000° C. to about 1200° C., to form a neodymium magnet sintered body. Thereafter, an aging treatment is performed at about 600° C. in order to increase the coercive force of the magnet. A rare earth sintered body can be prepared in this manner. The size of the sintered body is 30 mm×50 mm×50 mm, for example.

The resultant sintered body is subjected to a cutting process to form a plurality of thin plates (these plates will sometimes be called "substrates" and "wafers"). The resultant thin plates of the sintered body are finished by grinding for adjustment of the size and shape, and then subjected to surface treatment for improvement in long-term reliability. Magnetization is then performed, and, after passing through a testing process, a neodymium permanent magnet is completed. The magnetization may be performed before the cutting process.

Hereinafter, the cutting method of the present invention will be described with reference to FIGS. 1 to 3.

FIG. 1 schematically illustrates the construction of a wire-saw machine 100 suitably used for implementing the method for cutting a rare earth alloy of the embodiment of the present invention.

The wire-saw machine 100 has three main rollers 10a, 10b, and 10c and a pair of reel bobbins 40a and 40b. The main roller 10a placed under a reservoir 30 containing a coolant serves as a driver roller, and the main rollers 10b and 10c placed on both sides of the reservoir 30 serve as follower rollers. A sawing wire 20 is let out from one reel bobbin 40*a* and wound around the other reel bobbin 40*b*, for example, and vice versa, traveling in alternate directions (so called a double (shuttle)-driving method). A new portion of wire 20 can be supplied toward the reel bobbin 40*a* during the alternate travel of the wire 20 by setting longer the time for which the wire is wound around the reel bobbin 40*a* than the time for which the wire is wound around the reel bobbin 40*b*. The travel speed of the wire 20 is in the range of 600 m/min to 1500 m/min, for example, while the rate at which a new portion of wire is supplied is in the range of 1 m/min to 5 m/min, for example.

The wire 20 is arranged in 150 lines, for example, between the main rollers 10*a*, 10*b*, and 10*c*. To define the travel positions of the lines of the wire 20, grooves (depth: about 0.6 mm, for example) for guiding the wire 20 are formed in a polymer layer (for example, an organic polymer layer such as a polyurethane rubber layer) formed on the surface of each of the main rollers 10*a*, 10*b*, and 10*c*. The distance between the adjacent lines of the wire 20 is determined by the pitch of the guide grooves, which is in turn determined by the thickness of plates into which a workpiece is to be cut. An inorganic polymer layer made of a silicone elastomer or the like may also be used as the polymer layer.

Traversers 42*a* and 42*b* are placed near the reel bobbins 40*a* and 40*b*, respectively, for adjusting the reeling position. Five guide rollers 44 and one tension roller 46 are placed on the route from each of the reel bobbins 40*a* and 40*b* to the main roller 10*a*, for guiding the wire 20 and also adjusting the tension of the wire 20. The tension of the wire 20 is appropriately changed depending on various conditions (cut length, cutting rate, wire travel speed, and the like). For example, it is set in the range of 20 N to 40 N.

A sintered body workpiece 50 produced as described above is placed in the wire-saw machine 100 in the following manner.

A plurality of workpieces 50 are bonded to each other with an adhesive (not shown) made of an epoxy resin, for example, to be stacked one upon the other forming a plurality of blocks. These blocks are secured to a ferrous work plate 54 with carbon base plates 52 interposed therebetween. The work plate 54, the blocks of workpieces 50, and the carbon base plates 52 are also bonded to one another with an adhesive (not shown). The carbon base plates 52 are cut by the wire 20 after the workpieces 50 have been cut and until the work plate 54 stops lowering. That is to say, the carbon base plates 54 function as a dummy for protecting the work plate 54.

In this embodiment, the size of each block is designed at about 100 mm when measured in the travel direction of the wire 20. Therefore, in the illustrated example, the length of the cutting with the wire 20 is about 200 mm. In this embodiment, the workpieces 50 are grouped into a plurality of blocks as described above. However, the size of the blocks when measured in the wire travel direction is variable with the surface tension of the coolant and the wire travel speed. The number and disposition of workpieces 50 making up one block are also variable with the size of each workpiece 50. Accordingly, the workpieces 50 should be appropriately grouped into optimally-sized blocks in view of these factors.

The workpieces 50 placed as described above are lowered by a lift provided with a motor 58 and pressed against the traveling wire 20 to be cut into pieces. The lowering speed of the workpieces 50 is set in the range of 20 mm/hr to 50 mm/hr, for example, although it may change with the conditions.

The coolant stored in a coolant reservoir 60 is pumped out into piping 63 with a discharge pump 62. The piping 63 is divided midway into lower piping 64 and upper piping 66. The lower piping 64 and the upper piping 66 are provided with valves 63*b* and 63*a*, respectively, for regulating the flow of the coolant to the piping. The lower piping 64 communicates with a lower nozzle 64*a* provided at the bottom of the reservoir 30 used for immersion of the cut portion. The upper piping 66 communicates with upper nozzles 66*a*, 66*b*, and 66*c* for supply of the coolant from the opening of the reservoir 30 and upper nozzles 66*d* and 66*e* for cooling the main rollers 10*b* and 10*c*.

The reservoir 30 receives supply of the coolant via the upper nozzles 66*a*, 66*b*, and 66*c* and the lower nozzle 64*a*. At least during the cutting process, the coolant is kept overflowing from the opening of the reservoir 30 as shown by arrow F in FIG. 1. The coolant overflowing from the reservoir 30 is guided into a collection reservoir 72 with a collection pan 70 placed under the reservoir 30 and collected. The collected coolant is pumped out into the coolant reservoir 60 via circulation piping 76 with a discharge pump 74. A filter 78 is placed somewhere in the circulation piping 76 for separating and removing saw dust in the collected coolant. The way of collection is not limited to that described above, but a mechanism for separating saw dust by use of a magnetic force may be provided (see U.S. patent application Ser. No. 09/662,136, for example).

Figure 2:
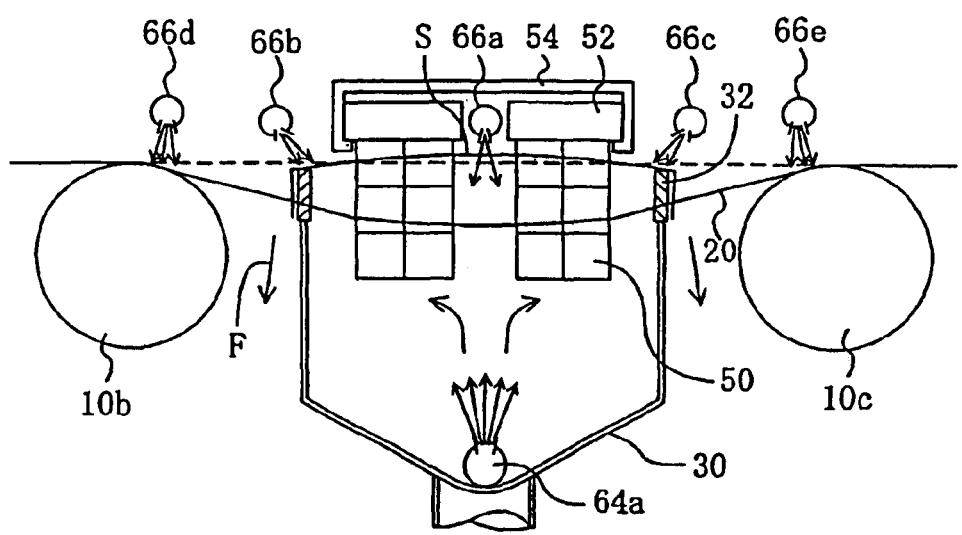
FIG. 2 is a diagrammatic view of a cutting section and its surrounds of the wire-saw machine 100 of FIG. 1.

Referring to FIG. 2, the cutting process according to the present invention will be described in more detail.

The reservoir 30 has auxiliary walls 32 formed at the opening along the sidewalls thereof extending to cross the wire travel direction. The auxiliary walls 32 are made of a plastic plate (acrylic plate, for example) and placed close to the wire travel position when the wire is non-loaded, shown by the dashed line in FIG. 2. When the workpieces 50 are lowered and brought into contact with the wire 20 for cutting, the wire 20 is bent as shown by the solid line in FIG. 2, allowing the cut portion to be immersed in the coolant in the reservoir 30. As the wire 20 is more bent, the auxiliary walls 32 are cut deeper with the wire 20, forming slits. Once the cutting with the wire 20 reaches a steady state, the bending amount becomes constant. The wire 20 now continues cutting the workpieces 50 while traveling through the slits formed in the auxiliary walls 32. In this way, the slits formed in the auxiliary walls 32 serve to regulate the travel positions of the lines of the wire 20 and contribute to stability of the machining precision.

The reservoir 30 has a volume of about 35 liters (L), for example. During the cutting process, the coolant is supplied into the reservoir 30 via the lower nozzle 64*a* at a flow rate of about 30 L/min, and also supplied via the upper nozzles 66*a*, 66*b*, and 66*c* at a flow rate of about 90 L/min, so that the coolant is kept overflowing from the opening of the reservoir 30. If only the supply of the coolant to the wire 20 is considered, the coolant does not necessarily overflow because the wire 20 is bent during the cutting as shown in FIG. 2. However, in order to enhance the discharge efficiency of saw dust, the construction described above is preferably adopted for the neodymium magnet sintered body in this embodiment.

To enhance the discharge efficiency of saw dust, it is effective to reduce the amount of saw dust contained in the coolant in the vicinity of the cut portion. To ensure sufficient discharge efficiency, the coolant preferably over-flows the reservoir by 50% of the volume of the reservoir per one minute. A fresh coolant is preferably supplied more from the opening of the reservoir 30 than from the bottom thereof.

Since the low-viscosity coolant containing water as the main component is used, saw dust released into the coolant easily settle down. If the coolant is supplied from the bottom of the reservoir 30 in a larger amount, the settling saw dust will be disadvantageously forced upward to float in the vicinity of the cut portion.

In order to increase the proportion of a fresh coolant supplied from the opening in the vicinity of the cut portion, it is preferable to increase the amount of coolant in the area of the reservoir 30 above the position of the traveling wire 20. Specifically, by supplying a fresh coolant from the opening of the reservoir 30, in addition to from the bottom thereof, and keeping the coolant overflowing from the opening, it is possible to reduce the amount of saw dust in the coolant supplied to the cut portion. Moreover, by a flow of the coolant supplied from the opening of the reservoir 30, saw dust attaching to the wire 20 can be automatically washed away.

The auxiliary walls 32 excluding the slits formed by the wire 20 function as sidewalls of the reservoir 30, whereby the liquid level S of the coolant is kept in the raised state. Curtain-like flows are formed by the coolant supplied from the nozzles 66b and 66c on the sides of the opening of the reservoir 30 crossing the wire travel direction, so that the coolant is suppressed from overflowing from the opening of the reservoir 30 and thus the liquid level S of the coolant swells higher than the auxiliary walls 32 of the reservoir 30. As a result, a larger amount of coolant is supplied surrounding the cut portion, and thus the amount of saw dust in the coolant can be further reduced. The delivery pressure for formation of the coolant flows described above is preferably in the range of 0.2 MPa (2 kgf/cm$^2$) to 1.0 MPa (10 kgf/cm$^2$), more preferably in the range of 0.4 MPa (4 kgf/cm$^2$) to 0.6 MPa (6 kgf/cm$^2$). If the delivery pressure is below the above range, a sufficient effect may not be obtained. If it exceeds the above range, the wire 20 may be wobbled, and as a result, the machining precision may be degraded.

Preferably, the coolant is also supplied to the main rollers 10b and 10c that regulate the travel positions of the wire 20. By the supply of the coolant to the main rollers 10b and 10c, the polymer layer (for example, a polyurethane layer) having the grooves for guiding the lines of the wire 20, which is formed on the surface of each of the main rollers 10b and 10c, is suppressed from temperature rise. In addition, saw dust (or sludge) attaching to or staying on the wire 20 or the guide grooves can be washed away. This prevents the wire travel position from deviating and the wire 20 from slipping off the groove. This also provides the effect of improving the discharge efficiency.

Examples of the surfactant added to the coolant containing water as the main component include: as anionic types, fatty acid derivatives such as fatty acid soap and naphthenic acid soap, sulfuric esters such as long-chain alcohol sulfuric esters and sulfonated oils of animal and vegetable oils, and sulfonic acids such as petroleum sulfonates; and as nonionic types, polyoxyethylenes such as polyoxyethylene alkylphenyl ethers and polyoxyethylene mono-fatty acid esters, polyalcohols such as sorbitan mono-fatty acid esters, and alkylolamides such as fatty acid diethanol amides. Specifically, by adding about 2 wt. % of chemical solution type JP-0497N (manufactured by Castrol Ltd.) to water, the surface tension and the coefficient of dynamic friction can be adjusted to fall within respective predetermined ranges.

Examples of the synthetic lubricant include synthetic solution type, synthetic emulsion type, and synthetic soluble type lubricants. Among these, a synthetic solution type lubricant is preferable. Specifically, SYNTILO 9954 (manufactured by Castrol Ltd.) and #830 and #870 (manufactured by Yushiro Chemical Industry Co., Ltd.) can be used. In either case, by adding about 2 wt. % to 10 wt. % of the lubricant to Water, the surface tension (or the coefficient of dynamic friction) can be adjusted to fall within a preferable range.

Corrosion of a rare earth alloy can be prevented by adding an anticorrosive. In particular, in the cutting of a R—FE—B rare earth alloy, the pH is preferably set at 8 to 11, more preferably 9 or more. Examples of the anticorrosive include: as organic types, carboxylates such as oleates and benzoates and amines such as triethanol amines; and as inorganic types, phosphates, bonates, molyb-dates, tungstates, and carbonates.

As a nonferrous metal anticorrosive, a nitride compound such as benztriazole may be used. As an antiseptic, a formaldehyde donator such as hexahydrotriazine may be used.

As the antifoaming agent, a silicone emulsion may be used. The addition of the antifoaming agent has effects of reducing foaming of the coolant, improving the infiltration of the coolant, improving the cooling effect, preventing temperature rise at the wire 20, and reducing the tendency to abnormal temperature rise and abnormal friction of the wire 20.

Figure 3:
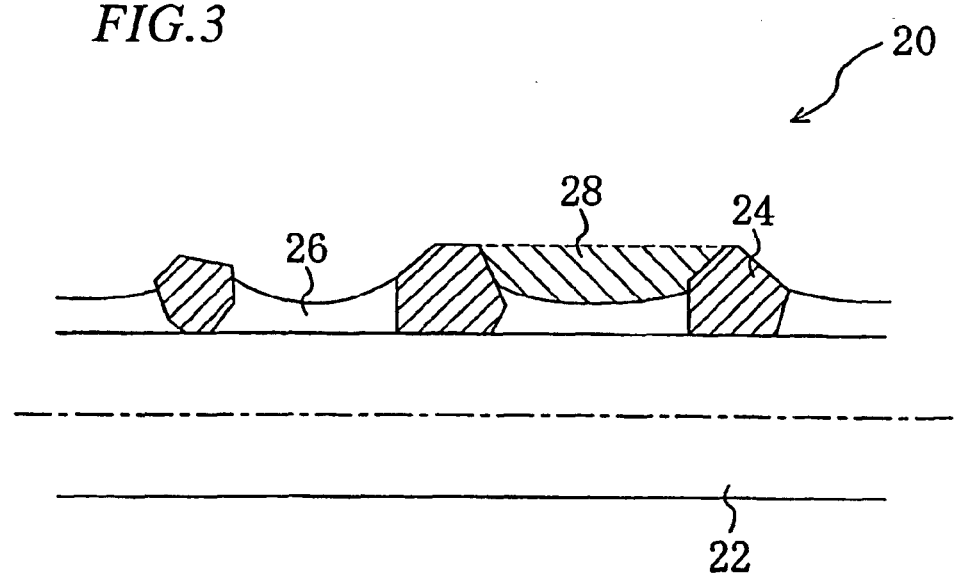
FIG. 3 is a diagrammatic cross-sectional view of a sawing wire 20 suitably used for implementing the method for cutting a rare earth alloy of the embodiment of the present invention.

Referring to FIG. 3, the structure of the sawing wire 20 suitably used in this embodiment will be described. Note that in FIG. 3, the lower half of the wire 20 with respect to the centerline shown by the one-dot chain line is simplified.

As the wire 20, suitably used is a wire with diamond abrasive grains 24 fixed to the outer circumference of a core wire (piano wire) 22 via a resin layer 26. As the resin, a phenol resin, an epoxy resin, or a polyimide resin is preferably used. These resins are high in adhesion strength to the outer circumference of the piano wire (hard steel wire), and also excellent in wettability (infiltration) for the coolant described above.

A preferred example of the wire 20 is a wire having an outer diameter of 0.24 mm with diamond abrasive grains having an average particle size of about 45 $\mu$m fixed to the outer circumference of the piano wire 22 having a diameter of about 0.18 mm via the resin layer 26 made of a phenol resin. From the standpoint of the cutting efficiency and discharge efficiency of saw dust (sludge), the average distance between the adjacent abrasive grains in the wire travel direction (axial direction; direction parallel to the one-dot chain line in FIG. 3) is preferably in the range of 150% to 600% of the average particle size D of the abrasive grains. In particular, preferably, abrasive grains having a small average particle size D are placed at the average inter-grain distance in the range of 150% to 400% of the average particle size D of the abrasive grains. By this placement, the load on the individual abrasive grains can be reduced. The average height of the portions of the abrasive grains protruding from the surface of the phenol resin layer 26 is preferably in the range of 10 $\mu$m to 40 $\mu$m. The resultant wire 20 has appropriately sized spaces 28 (also called "chip pockets") between the abrasive grains 22, which contribute to providing good cutting efficiency and good discharge efficiency.

(Embodiment 2)

A method for cutting a rare earth alloy of Embodiment 2 of the present invention will be described with reference to FIG. 4.

Figure 4:
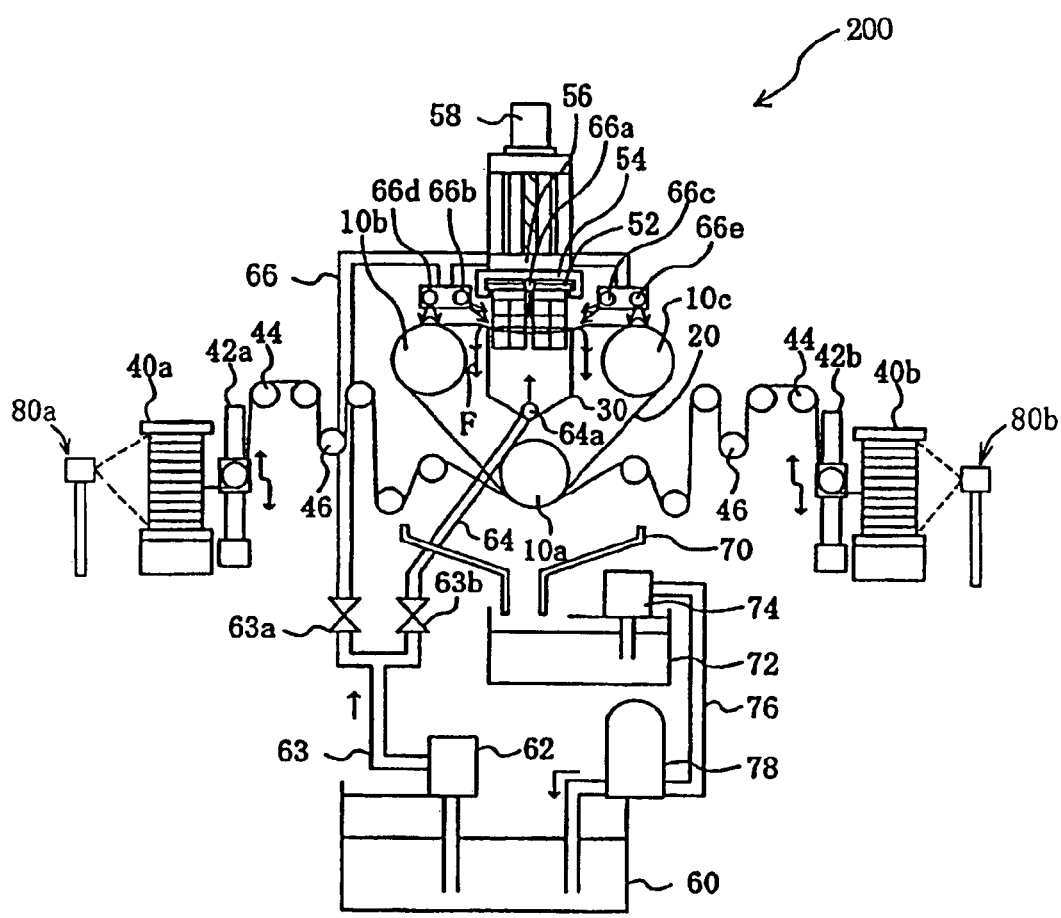
FIG. 4 is a diagrammatic view of a wire-saw machine 200 suitably used for implementing the method for cutting a rare earth alloy of another embodiment of the present invention.

FIG. 4 schematically illustrates the construction of a wire-saw machine 200 suitably used for implementing the method for cutting a rare earth alloy of Embodiment 2 of the present invention.

The wire-saw machine 200 includes sprayers 80a and 80b for supplying the coolant to the portions of the wire 20 wound around the reel bobbins 40a and 40b, respectively, in addition to the components of the wire-saw machine 100 of Embodiment 1. In this embodiment, since the wire 20 with abrasive grains fixed thereto with a resin is used, spraying is adopted for effective supply of a small amount of coolant to the wire 20.

Figure 5:
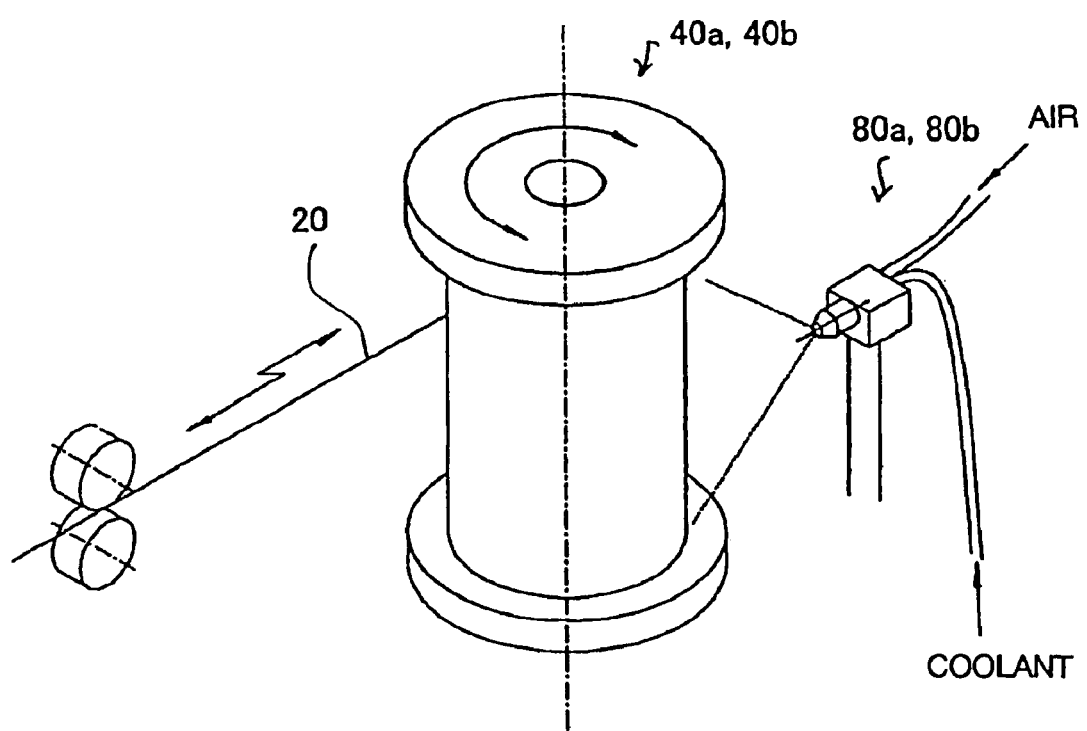
FIG. 5 is a diagrammatic view of a structure for supplying a coolant to a sawing wire 20 wound around a reel bobbin 40a, 40b of the wire-saw machine 200.

As shown in FIG. 5, for example, a coolant (200 ml/min, for example) and an air (0.4 MPa, for example) are sent to a spray nozzle of the sprayer 80a, 80b so that the coolant can be sprayed over the entire portion of the wire 20 wound around the reel bobbin 40a, 40b (core outer diameter: 170 mm, height: 340 mm, for example). As the coolant, the coolant stored in the coolant reservoir 60, which will be described later, is commonly used, and is pumped out into the sprayers 80a and 80b via piping with a discharge pump. Alternatively, a coolant different from that supplied to the cut portion may be used by providing a separate coolant reservoir for supplying the coolant to the sprayers 80a and 80b.

The area in which the coolant is sprayed may be restricted to reduce damage to the wire by the coolant and/or reduce the amount of the coolant used. There may be provided a mechanism for selectively supplying the coolant to the area in which the winding (or unwinding) operation is underway and thus friction between adjacent windings of the wire 20 is generated, in synchronous with the movement of the traverser 42a, 42b shown in FIG. 4. Especially the abrasive grains of wire 20 damage the resin layer of the wire 20 by the friction. As described in Embodiment 1, the wire 20 travels in alternate directions. Therefore, a strong tension is generated to the wire 20 when the traveling direction is reversed.

The means for supplying the coolant is not limited to the illustrated sprayers 80a and 80b, but dropping devices and the like may be used. When a comparatively large amount of coolant is to be supplied, a collection pan may be provided under each of the reel bobbins 40a and 40b for collection and reuse of an excess coolant. A filter and/or a magnetic separator are preferably provided on the collection route of the coolant to separate and remove saw dust contained in the collected coolant.

In this embodiment, the coolant was sprayed over the wire after being wound around the reel bobbin. Alternatively, the coolant may be supplied to the wire immediately before being wound around the reel bobbin. When at least one of two windings of the wire coming into contact with each other is wet, damage to abrasive grains fixed thereto can be reduced.

The damage caused by mutual friction between adjacent windings of the wire 20 also depends on the tension of the wire 20. Therefore, a mechanism is preferably provided for reducing the tension at the winding of the wire 20 around the reel bobbin 40a, 40b. As the mechanism for reducing the winding tension, mechanisms disclosed in Japanese Laid-Open Patent Publication Nos. 9-29607, 9-314548, 10-166353, and 10-277914 may be used. The winding tension at the reel bobbins 40a and 40b is preferably 15 N or less. To avoid the wound wire on the reel bobbins 40a and 40b from getting out or order by sagging or slipping down, the winding tension is preferably 4 N or more. If it is less than 4 N, the resin may rather come off.

Using the wire-saw machine 200 described above, the neodymium magnet alloy was actually cut with a wire manufactured by Allied Material Corp. satisfying the specifications discussed in Embodiment 1, and the effect of the cutting was examined. The cutting was performed with the wire traveling in the opposite directions alternately under the conditions of the maximum travel speed of 1100 m/min, a tension of 30 N, a cutting rate of 40 mm/hour, and a fresh wire supply rate of 2 m/min, using an aqueous solution (temperature: 23° C.) of about 10% of #830 manufactured by Yushiro Chemical Industry Co., Ltd. as the coolant sprayed to the reel bobbins at a supply rate of 200 ml/min. As a result, the amount of abrasive grains and the proportion of the resin layer that had come off during the operation reduced to about one-third of those observed when no coolant was sprayed to the reel bobbins 40a and 40b (wire length: 38 km). Substantially the same results were obtained when the concentration of Yushiro #830 was adjusted to obtain a coolant having a coefficient of dynamic friction of 0.1 to 0.13, a surface tension of 33 to 36 mN/m, and a viscosity of 1 to 4 mPa·s (kinematic viscosity of 1 to 4 $mm^2/s$).

As described above, in Embodiment 2, the life of the wire can be made longer when used in the wire-saw machine for cutting a rare earth alloy using the coolant containing water as the main component. Although the optimum effect can be attained by combining the feature of this embodiment with the cutting method of Embodiment 1, the supply of the coolant to the cut portion may be performed in a different way.

Hereinafter, a preferred structure of the main rollers 10a, 10b, and 10c of the wire-saw machine 100 of Embodiment 1 and the wire-saw machine 200 of Embodiment 2 will be described.

When the coolant containing water as the main component is used, the rate of wire snapping is high, that is, the wire tends to snap in a short time, compared with when an oil-base coolant is used. From the results of an examination in various aspects, the reason is considered as follows. A water-base coolant is low in lubrication compared with an oil-base coolant, and therefore, fails to sufficiently reduce the friction between the wire and the slopes of the guide grooves of the rollers. The abrasive grains might bite the surface of the slopes of the guide grooves of the rollers. As a result, torsion is applied to the wire.

Figure 6:
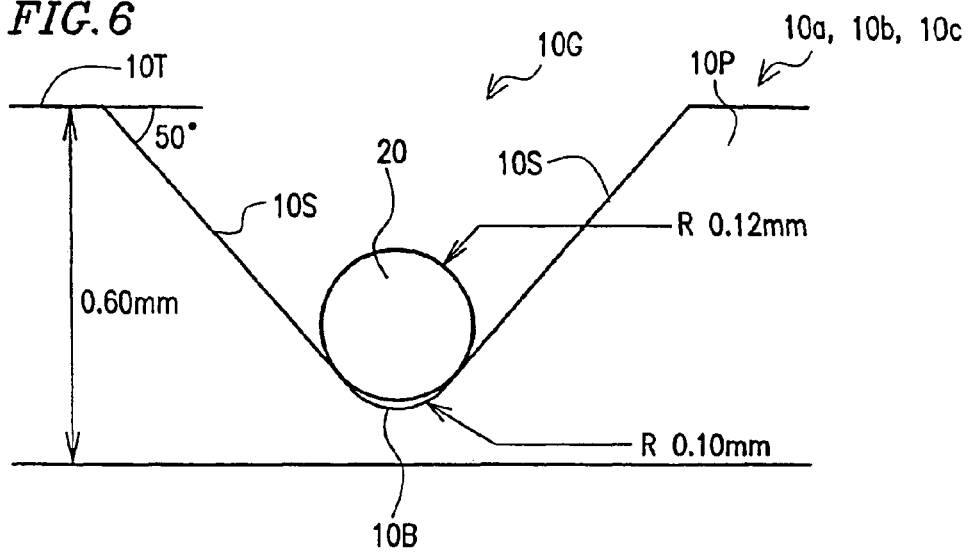
FIG. 6 is a diagrammatic cross-sectional view of a roller suitably used for the wire-saw machines 100 and 200.

The snapping of the wire 20 can be suppressed by adopting the following construction. FIG. 6 diagrammatically shows a cross-sectional shape of a guide groove 10G formed in a polymer layer 10P of the roller 10a, where a pair of slopes 10S of the guide groove 10G have an angle (tilt angle) of 50 degrees or more with respect to a surface 10T of the roller 10a. As illustrated, both the slopes 10S constituting the guide groove 10G preferably have an angle of 50 degrees or more with respect to the surface 10T of the roller 10a. However, the effect of suppressing occurrence of snapping can be obtained as long as at least one of the slopes 10S has an angle of 50 degrees or more with respect to the surface 10T.

Figure 7:
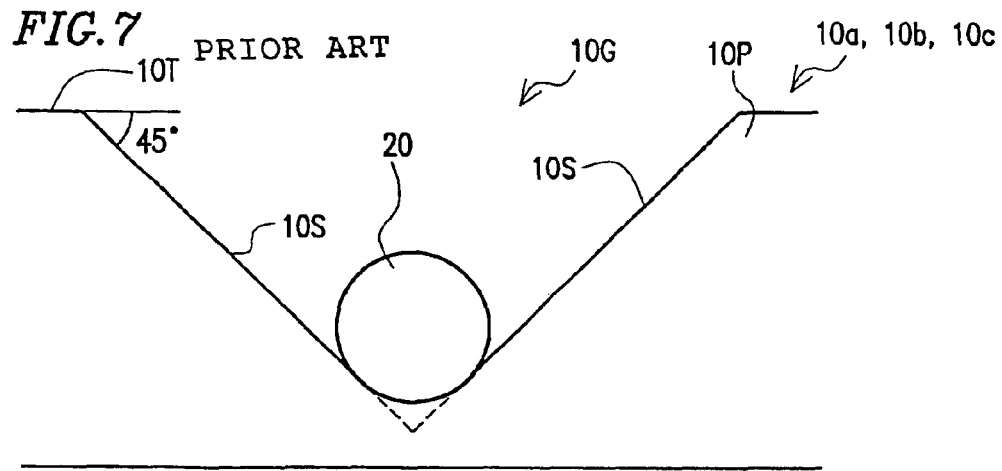
FIG. 7 is a diagrammatic cross-sectional view of a conventional roller.

On the contrary, the conventional roller adopts a construction as shown in FIG. 7, for example, in which the slopes 10S of the guide groove 10G have an angle of 45 degrees or less with respect to the surface of the roller. A rare earth alloy, which has the main phase causing brittle fracture and the grain boundary phase causing ductile fracture, is high in cutting resistance. Also, since a rare earth alloy is large in specific gravity, the discharge efficiency of saw dust (or sludge) thereof is poor. For these reasons, this construction is conventionally adopted to ensure efficient and sufficient discharge of sludge from the guide groove 10G. However, in the guide groove 10G of which the slopes 10S have a tilt angle of 45 degrees or less, large friction is generated between the slopes 10S and the wire 20, and this tends to cause snapping of the wire 20. Especially, in the case where the wire 20 travels in alternate directions, a strong tension is generated to the wire 20 when the traveling direction is reversed.

The number of times of snapping of the wire was evaluated using the wire-saw machine 100 for sets of the rollers 10a, 10b, and 10c different in the tilt angle of the slopes 10S. A polyurethane rubber layer was used as the polymer layer 10P, and an aqueous solution of about 10% of Yushiro #830 was used as the coolant. Workpieces of the rare earth sintered magnet used in Embodiment 1 were cut continuously for 300 hours, and the number of times the wire 20 snapped during this operation was measured. The results are shown in Table 1 below as the relationship between the tilt angle of the slope 10S and the number of times of snapping.

TABLE 1

| Tilt angle of slope (degree) | 30 | 40 | 50 | 55 | 60 | 65 | 70 | 80 |
|---|---|---|---|---|---|---|---|---|
| Number of times of snapping | 12 | 11 | 3 | 3 | 3 | 3 | 4 | 5 |

As is found from Table 1, the number of times of snapping is reduced by setting the tilt angle of the slopes 10S of the guide groove 10G at 50 degrees or more. This is presumably because the torsion applied to the wire 20 due to friction between the slopes 10S and the wire 20 decreases when the tilt angle is 50 degrees or more. The number of times of snapping tends to slightly increase when the tilt angle is 70 degrees or more, presumably because the discharge efficiency of sludge decreases. From the results of this experiment, it is found that the tilt angle of the slopes 10S of the guide groove 10G is preferably in the range between 50 degrees and 80 degrees, more preferably in the range between 50 degrees and 65 degrees. If the tilt angle exceeds 80 degrees, the possibility that the wire 20 comes off the guide groove 10G increases. The guide groove 10G preferably has a curved bottom 10B having a radius of curvature slightly smaller than the radius of the wire 20.

The number of times the wire 20 snaps also depends on the tension of the wire 20 traveling between the rollers. Table 1 above shows the results obtained when the tension of the wire 20 is 30 N. Substantially the same results are obtained when the tension of the wire 20 is in the range between 25 N and 35 N.

Thus, according to the present invention, provided is the method for cutting a rare earth alloy with the abrasive grain-fixed wire, which can be realized by using a coolant containing water as the main component. Also, according to the present invention, the life of the wire can be made longer by reducing damage to the abrasive grains fixed to the wire and the wire itself. Moreover, according to the present invention, the wire-saw machine suitably used for the cutting method described above is provided.

By employing the cutting method of the present invention, a rare earth alloy can be cut with high machining precision with a smaller cutting margin. Therefore, loss of expensive materials for the rare earth metal alloy can be minimized. In addition, recycling of the coolant can be easily realized, which is friendly to the environment and also decreases the cost for disposal of liquid waste. This permits reduction of the cost for machining the rare earth metal alloy, and thus, realizes low-cost manufacture of cut products of the alloy, such as rare earth magnets used for voice coil motors for positioning a magnetic head.

Although the wire-saw machines 100 and 200 are exemplified in the above Embodiments, the present invention may be applied to an endless-type wire-saw machine which employs a single reel bobbin (see Japanese Laid-Open Patent Publication No. 11-198018, for example).

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A method for manufacturing a rare earth magnet comprising the steps of:

producing a rare earth magnet sintered body from rare earth alloy powder; and dividing the sintered body into a plurality of rare earth magnets, wherein the step of dividing the sintered body is executed by a method for cutting a rare earth magnet sintered body using a wire with abrasive grains fixed to a core wire, comprising the step of:

cutting the rare earth magnet sintered body with the wire traveling in a state that a portion of the rare earth alloy sintered body to be cut with the wire is immersed in a coolant containing water as the main component, the coolant having a surface tension at 25° C. in a range of 25 mN/m to 60 mN/m.

2. A method for manufacturing a rare earth magnet comprising the steps of:

producing a rare earth magnet sintered body from rare earth alloy powder; and dividing the sintered body into a plurality of rare earth magnets, wherein the step of dividing the sintered body is executed by a method for cutting a rare earth magnet sintered body using a wire with abrasive grains fixed to a core wire, comprising the steps of:

allowing the wire wound around a reel bobbin to travel between a plurality of rollers;

supplying a first coolant containing water as the main component to portions of the wire wound around the reel bobbin or portions of the wire traveling near the reel bobbin; and cutting the rare earth magnet sintered body with the traveling wire while a second coolant coptaining water as the main component is supplied to a portion of the rare earth magnet sintered body to be cut with the wire.

* * * * *